United States Patent
Smith-Rose et al.

(10) Patent No.: US 12,184,674 B2
(45) Date of Patent: Dec. 31, 2024

(54) COMPUTER-BASED SYSTEMS CONFIGURED FOR CONTEXTUAL NOTIFICATION OF MONITORED DARK WEB INTELLIGENCE AND METHODS OF USE THEREOF

(71) Applicant: Capital One Services, LLC, McLean, VA (US)

(72) Inventors: Asher Smith-Rose, Midlothian, VA (US); Tyler Maiman, Melville, NY (US); Joshua Edwards, Philadelphia, PA (US); Lin Ni Lisa Cheng, Great Neck, NY (US); Shabnam Kousha, Washington, DC (US)

(73) Assignee: Capital One Services, LLC, McLean, VA (US)

(*) Notice: Subject to any disclaimer, the term of this patent is extended or adjusted under 35 U.S.C. 154(b) by 281 days.

(21) Appl. No.: 17/949,636

(22) Filed: Sep. 21, 2022

(65) Prior Publication Data
US 2024/0098098 A1    Mar. 21, 2024

(51) Int. Cl.
*H04L 9/40* (2022.01)
*H04L 41/16* (2022.01)
*H04L 41/22* (2022.01)

(52) U.S. Cl.
CPC .......... *H04L 63/1416* (2013.01); *H04L 41/16* (2013.01); *H04L 41/22* (2013.01); *H04L 63/20* (2013.01)

(58) Field of Classification Search
CPC ..... H04L 63/1416; H04L 41/16; H04L 41/22; H04L 63/20
See application file for complete search history.

(56) References Cited

U.S. PATENT DOCUMENTS 7,441,429 B1   10/2008   Nucci et al.
8,244,818 B2   8/2012    Martin et al.
(Continued)

FOREIGN PATENT DOCUMENTS

WO    2008/083087 A2    7/2008

OTHER PUBLICATIONS

Adewopo et al. Deep Learning Algorithm for Threat Detection in Hackers Forum (Deep Web), arXiv:2202.01448v1 [cs.CR] Feb. 3, 2022, 13 pages (Year: 2022).*

(Continued)

*Primary Examiner* — Oleg Korsak
(74) *Attorney, Agent, or Firm* — Greenberg Traurig, LLP

(57) ABSTRACT

The present disclosure provides an exemplary method, system, and computing device that may include the steps of receiving a first indication that information of a user has been detected at one or more dark web resources; classifying the item of the compromised information into an information type category; receiving a permission indicator to detect communications by the computing device; receiving a second indication of a communication; receiving a third indication that the user engages an interaction with the communication; instructing the computing device to execute a technique to obtain data for the communication; receiving the data for the communication; determining the communication is a spam communication; determining a current information type category being discussed during the spam communication; making a determination that the current information type category corresponds to the information type category; and instructing a graphical user interface to display an alert to the user.

20 Claims, 8 Drawing Sheets

(56) References Cited

U.S. PATENT DOCUMENTS

| | | | |
|---|---|---|---|
| 8,671,144 B2 | 3/2014 | Gellens | |
| 10,496,994 B2 | 12/2019 | Hopper | |
| 11,301,522 B1* | 4/2022 | Kim | G06F 16/9574 |
| 11,423,175 B1* | 8/2022 | Mahajan | G06V 40/172 |
| 2007/0047523 A1 | 3/2007 | Jiang | |
| 2008/0281794 A1 | 11/2008 | Mathur | |
| 2010/0154057 A1 | 6/2010 | Ko et al. | |
| 2018/0288073 A1* | 10/2018 | Hopper | H04L 63/1425 |
| 2020/0151222 A1* | 5/2020 | Mannar | G06F 16/951 |
| 2021/0357498 A1* | 11/2021 | McEachern | G06F 21/552 |
| 2021/0392048 A1* | 12/2021 | Olden | H04L 41/0816 |
| 2022/0224723 A1* | 7/2022 | Crabtree | H04L 63/20 |

OTHER PUBLICATIONS

Koloveas et al. INTIME: A Machine Learning-Based Framework for Gathering and Leveraging Web Data to Cyber-Threat Intelligence, Electronics 2021, 10, 818, 34 pages (Year: 2021).*

* cited by examiner

COMPUTER-BASED SYSTEMS CONFIGURED FOR CONTEXTUAL NOTIFICATION OF MONITORED DARK WEB INTELLIGENCE AND METHODS OF USE THEREOF

FIELD OF TECHNOLOGY

The present disclosure generally relates to improved computer-implemented methods, improved computer-based platforms or systems, improved computing components and devices configured for one or more practical technological improvement applications utilizing one or more machine learning techniques and natural language processing techniques to delivery intelligence monitored from dark web, including, but not limited to, sensitive and/or private information of users.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management. For example, without limitation, user's private or sensitive information compromised by fraudulent activities may become available in a website of a dark web. Although a user can be proactively notified of such compromised information based on results of dark web scanning, such notification is un-tethered from fraudulent communications and there is no automatically triggered contextual notification that prevents the user from vishing attacks utilizing the compromised information, during risky communication in real time.

SUMMARY OF DESCRIBED SUBJECT MATTER

In some embodiments, the present disclosure provides various exemplary technically improved computer-implemented methods involving contextual notification of compromised information, the method including steps such as: receiving, by one or more processors, a first indication that information of a user has been detected at one or more dark web resources, the first indication including at least one item of compromised information; classifying, by the one or more processors, the at least one item of the compromised information into an information type category of a plurality of information type categories, the information type category describing a content, a context, or both, of the at least one item of the compromised information; receiving, by the one or more processors, from a computing device of the user, a permission indicator identifying a permission by the user to detect communications being received by the computing device; receiving, by the one or more processors, from the computing device, a second indication of at least one communication being received; receiving, by the one or more processors, a third indication that the user engages an interaction with the at least one communication; instructing, by the one or more processors, after receiving the third indication, the computing device to execute at least one machine learning (ML) technique, at least one natural language processing (NLP) technique, or both, to obtain context data, content data, and/or both, for the at least one communication; receiving, by the one or more processors, from the computing device, the context data, the content data, and/or both, for the at least one communication; determining, by the one or more processors, when the at least one communication is a spam communication based on the context data, the content data, and/or both, for the at least one communication; determining, by the one or more processors, in real-time, during the spam communication, based on the context data, the content data, and/or both, a current information type category of the plurality of information type categories that is being discussed during the spam communication; making, by the one or more processors, in real-time, during the spam communication, a determination that the current information type category corresponds to the information type category classified for the at least one item of the compromised information; and instructing, by the one or more processors, and in response to the received third indication and the determination, the computing device to present, to the user, a graphical user interface (GUI) associated with the spam communication, where the GUI includes at least one GUI element, displaying an alert indicating to the user at least one of: the current information type category has been compromised, the at least one item of the compromised information, and/or both.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
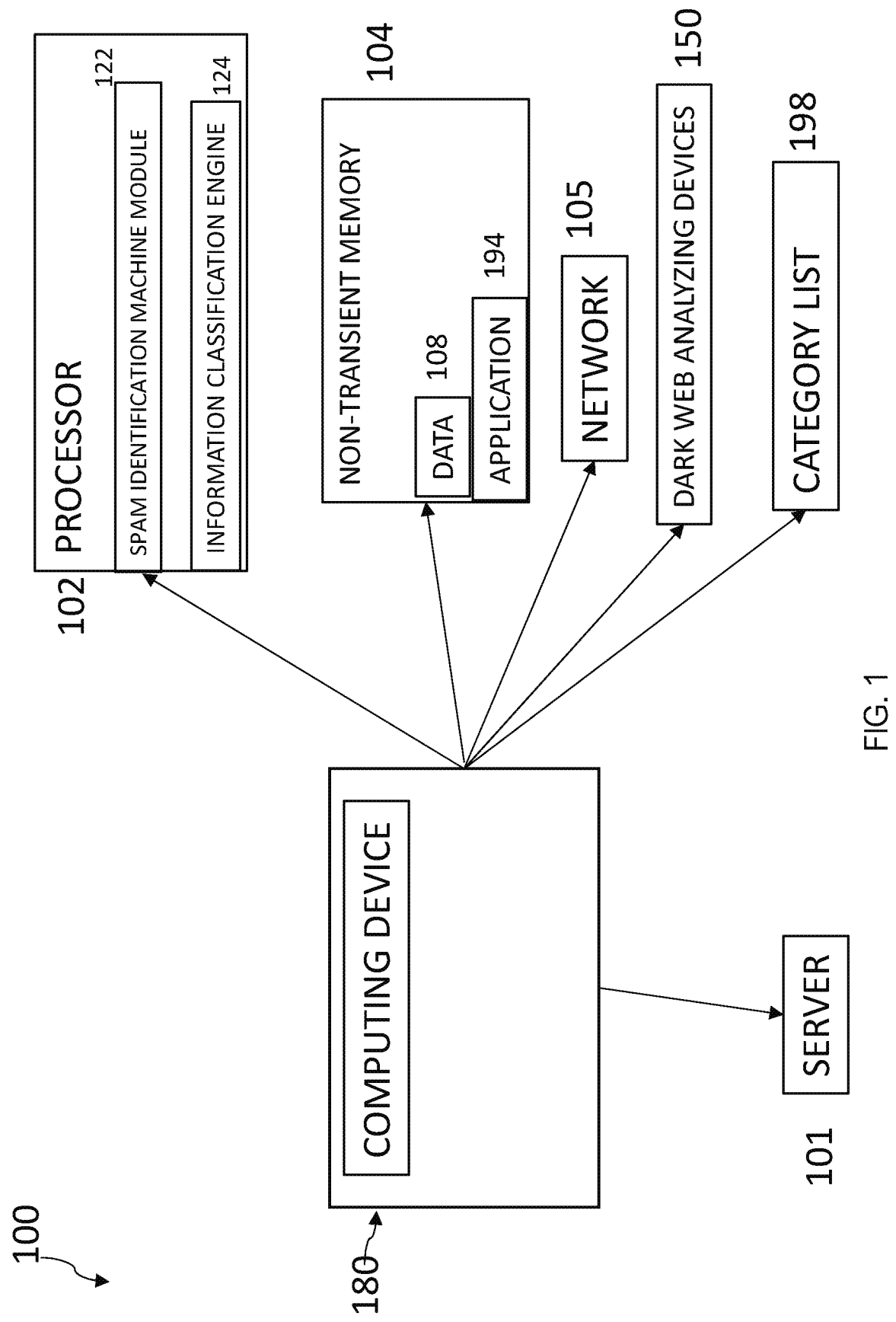
FIG. 1 is a block diagram of an exemplary system and/or platform illustrating aspects of contextual notification of compromised information (e.g., anti-vishing notification of information compromised in the dark web), consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the intelligence gleaned from dark web monitoring and analytics, and at the same time to leverage advanced data processing capabilities, various embodiments of the present disclosure provide for improved computer-based platforms and/or systems, improved computing components and devices configured for one or more practical technological improvements involving: receiving an indication that a user's personal/sensitive information has been compromised in the dark web; detecting communications received at computing devices of users, determining a context to notify the user of the risk related to the received indication (e.g., via determining a communication received by the user on a computing device as spam, and determining the communication context and/or content when the user engages an interaction with the spam-like communication, etc.), by utilizing at least one machine learning (ML) technique, at least one natural language processing (NLP) technique, and/or both, and notifying the user of the type of the personal/sensitive information that has been compromised on the dark web via a real-time update to a user interface presentation during the communication based on the relevant real-time context/content determination. As a result, the user can be protected from various security attacks (e.g., vishing sensitive, private, and/or security related data) in real time with enhanced efficiency, accuracy, relevancy, and accessibility.

As detailed herein, typically, various computer-based technological problems may arise when computer technology may be utilized by fraudsters to engage in various types of technology-facilitated fraudulent attacks. As used herein, in some embodiments, the term "vishing" refers to a fraudulent act and/or a security attack using verbal and/or audio scams and/or schemes to trick people into performing certain actions believed as done in their best interest or protection. Typically, in vishing, fraudsters could try to convince unsuspected users to provide them valuable information over the phone. The valuable information can include, without limitation, any sensitive information (that can be further used for additional social engineering), credit card numbers, credentials, full legal names, birthdates, home addresses, billing addresses, mother's maiden names, phone numbers, credit card information, financial information, login credentials, and the like. Typically, vishing calls may exploit the fact that we're more likely to trust a human voice. Typically, the vishing attacks may differ in scope, targets and/or patterns. In some cases, a vishing attacker could engineer personalized attacks by obtaining private/sensitive information of a user that is compromised and become available in the dark web. In some cases, vishing attacks may also be performed via malware installed on the user's computing device and trick the user into calling the vishing attacker themselves. For example, cybercriminals may engage a vishing campaign targeting employees working from home. For example, the attackers may collect login credentials for corporate networks, which they then monetized by selling access to corporate resources to other bad actors.

Typically, vishing attacks may be sophisticated and require thorough research and a phishing setup to work. The phishing pages were made to look like a targeted company's internal VPN (Virtual Private Network) login page, and the sites were also capable of capturing two-factor authentication (2FA) if the situation required. Typically, bad actors then may compile dossiers on the people they may want to target, typically by searching the dark web, mass scraping of public profiles on social media platforms, recruiter and marketing tools, publicly available background check services, and/or open-source research. Typically, collected information may include: name, home address, birth date, personal cell/phone number, work address, bank account number, credit card number, authentication credential, the position at the company, and duration at the company, and so on.

There could be the following exemplary vishing attacks:
i) Telemarketing Fraud—where fraudsters intend to scam users for payment and/or quick gain; for an example, 'a charity needs your help and that you can make a difference with even just a small donation;' in such case, the charities don't exist, and the donated money ends up in the hands of the fraudsters;
ii) Government Impersonations—where fraudsters impersonate the government (usually Tax Authorities, Social Security and so on) to scam the users; fraudsters may use the emergency of a situation to request payments;
iii) Tech Support Fraud—fraudsters pretending to be tech support for a company; the fraudster may inform the user that something is wrong with their device and they'd need remote access to fix it; later, they'd charge the user for the problem that didn't even exist;
iv) Bank or Financial Institutions Impersonations—financial vishing scams often involve an actor impersonating a bank, credit card company, and/or another financial institution to get information about your personal, financial, and/or account credentials.

Typically, vishing is just one form of phishing, which is any type of message—such as an email, text, phone call and/or direct-chat message—that appears to be from a trusted source but is not. Typically, the goal is to steal someone's identity and/or money. Typically, one computer-based telecommunication technological problem, involving vishing and/or any other type of phishing attacks, may be due to the fact that computer-based telecommunication technology may make it easier to contact more people. For example, scammers may place hundreds of calls at a time using voice over internet protocol (VoIP) technology and can spoof the caller ID to make the call appear to come from a trusted source, such as one's bank.

Various embodiments disclosed herein have been provided to address technological problems identified herein and similarly suitable other technological problems.

Various embodiments disclosed herein may be implemented in connection with one and/or more entities that provide, maintain, manage, and/or otherwise offer any services relating to spam verification and/or spam alert system (s). In some embodiments, the exemplary entity may be a financial service entity that provides, maintains, manages, and/or otherwise offers financial services. Such financial service entity may be a bank, credit card issuer, and/or any other type of financial service entity that generates, provides, manages, and/or maintains financial service accounts that entail providing a transaction card to one or more customers, the transaction card configured for use at a transacting terminal to access an associated financial service account. In some embodiments, financial service accounts may include, for example, credit card accounts, bank accounts such as checking and/or savings accounts, reward and/or loyalty program accounts, debit account, and/or any other type of financial service account known to those skilled in the art.

FIG. 1 depicts an exemplary computer-based system 100 illustrating aspects of technologically improved contextual notification of compromised information (e.g., anti-vishing notification of information compromised in the dark web), via utilization of at least one machine learning technique, in accordance with one or more embodiments of the present disclosure. An exemplary system 100 may include at least one server 101, and at least one computing device 180 associated with a user, which may communicate 103 (not shown in FIG. 1) over at least one communication network 105. In some embodiments and in optional combination with one or more embodiments described herein, the system 100 may further include and/or be operatively connected and/or be in electronic communication with one or more dark web analyzing devices 150, from which the server 101 may receive various information obtained from the dark web with regard to the user.

In some embodiments, the dark web analyzing device 150 may be configured to perform searches of the dark web for particular content based on, for example, keyword terms pertaining to the user. Typically, the dark web contains information that cannot be indexed and/or searched for by a standard search engine. In another example, the dark web includes web pages that are not linked by other pages searchable by a standard search engine, archived web pages, dynamic pages returned by a server in response to a query, textual content encoded in multimedia format, and so on. However, hidden or inaccessible from standard web browsers, the dark web is accessible via anonymous network via special software including, but not limited to, "The Onion Ring" ("Tor") and Invisible Internet Project (I2P) services. Anonymous network may include a portion of the Internet where anonymizing software networks allow access to the dark web. In one example, I2P provides an anonymous peer to peer distributed communication services to allow applications to send messages to each other. In one example, Tor can be installed into a browser executing on the dark web analyzing device 150 to establish special connection to dark websites hosting hidden resources in the dark web. Once a top-level domain of the dark web is identified, dark websites can be identified based on their respective uniform resource locators (URLs). As such, using a Tor browser, a connection may be made to a Tor router that encrypts the network address of the dark web analyzing device 150 so that to maintain anonymity in browsing and searches.

Still referring to FIG. 1, in some embodiments, the dark web analyzing device devices 150 may be hosted and/or implemented at the server 101 such that both the above-described dark web analyzing capability together with the features and functionality associated with the server 101 may be implemented for the same entity such as, for example, the financial service entity described above. For instance, the server 101 may include an authentication server such that the server 101 may both obtain the dark web analytics and furnish the anti-vishing protection using the analytics in real time against spam communication detected at the computing device 180.

In other embodiments, the dark web analyzing device 150 may be implemented at one or more computing devices independent of the server 101 so as to separate the dark web analyzing capabilities from the features and functionality of the server 101. For example, in some embodiments, the server 101 may be configured to enable and/or provide the features and functionality of anti-vishing protection with regard to the identified spam communications received at the computing device 180 from a multitude of dark web analyzing devices that may be associated with various entities for safeguarding the private/sensitive information of the user. By way of non-limiting examples, an entity associated with the dark web analyzing device 150 may include a banking entity, an online retailer, an entity providing a streaming service, a gaming service, an email service, a social media site, a chat service, a government agency, an individual user, an entity specialized in monitoring and crawling the dark web, and the like.

In some embodiments, server 101 may include computers, servers, mainframe computers, desktop computers, etc. configured to execute instructions to perform server and/or client-based operations that are consistent with one or more aspects of the present disclosure. In some embodiments, server 101 may include a single server, a cluster of servers, or one or more servers located in local and/or remote locations. In some embodiments, server 101 may be stand-alone, and/or it may be part of a subsystem, which may, in turn, be part of a larger computer system. In some embodiments, server 101 may be associated with an entity such as a financial institution, such as a credit card company that services an account of the user, and thereby having the need to verify and/or authenticate the user in association with various aspects of providing the account services. For instance, the credit card company may host various network resources (e.g., web servers hosting banking services and credit card services, databases, emails, web portals, etc.) that may require the user to authenticate himself and/or herself in order to access. Typically, the user authentication may include a two-factor authentication process using user credentials (e.g., usernames and passwords) together with a valid one-time PIN (OTP). In one example, the server 101 may host an authentication server in connection with hosting the network resources provided to the user.

Still referring to FIG. 1, server 101 may include at least one processor 102, and a non-transient memory 104, such as random-access memory (RAM). In some embodiments, memory 104 may store application(s) and data 108. Various embodiments herein may be configured such that the application(s) and data 108, when executed by the processor 102, may utilize one or more machine learning techniques to provide all or portions of the features and/or functionality associated with contextual notification of compromised information (e.g., anti-vishing notification of information compromised in the dark web), in conjunction with or independent of contextual notification of compromised information implemented at the computing device 180.

In some embodiments, the features and functionality may include operations such as: receiving an indication that information of a user has been detected at one or more dark web resources, the first indication including at least one item of compromised information; classifying the at least one item of the compromised information into an information type category of a plurality of information type categories, the information type category describing a content, a context, and/or both, of the at least one item of the compromised information; receiving an indicator identifying a permission by a user to detect phone calls, emails, messages, and/or other communications received at a computing device of the user; receiving an indication of a communication being received at the computing device; receiving an indication of the user engaging an interaction with the communication; instructing, by the one or more processors the computing device to execute at least one machine learning (ML) technique, at least one natural language processing (NLP) technique, and/or both, to obtain context data, content data, and/or both, for the at least one communication; determining when the communication is a spam communication based on the context data, the content data, and/or both, for the at least one communication; determining, in real-time, during the spam communication, based on the context data, the content data, and/or both, a current information type category of the plurality of information type categories that is being discussed during the spam communication; making, in real-time, during the spam communication, a determination that the current information type category corresponds to the information type category classified for the at least one item of the compromised information; instructing, in response to the received third indication and the determination, the computing device to present an alert indicating to the user at least one of: the current information type category has been compromised, the at least one item of the compromised information, and/or both.

In some embodiments, the application(s) and data 108 may include an exemplary spam identification module 122. In some embodiments, the spam identification module 122 may be trained at the server 101. In other embodiments, the spam identification module 122 may be trained by another entity with the training data provided by another entity, and/or with the training data provided by server 101. In some embodiments, the spam identification module 122 may also be trained and re-trained at the computing device 180 associated with the user. In the latter case, the spam identification module 122 may be trained and/or re-trained with training data specific to the user at the computing device 180. In this sense, the spam identification module 122 itself may be user-specific, residing on the server 101 and/or the computing device 180.

Various machine learning techniques may be applied to train and re-train the spam identification module 122 with training data and feedback data, respectively. In various implementations, such a machine learning process may be supervised, unsupervised, and/or a combination thereof. In some embodiments, such a machine learning model may comprise a statistical model, a mathematical model, a Bayesian dependency model, a naive Bayesian classifier, a Support Vector Machine (SVMs), a neural network (NN), and/or a Hidden Markov Model.

In some embodiments and, optionally, in combination of any embodiment described above or below, an exemplary neutral network technique may be one of, without limitation, feedforward neural network, radial basis function network, recurrent neural network, convolutional network (e.g., U-net) and/or other suitable network. In some embodiments and, optionally, in combination of any embodiment described above or below, an exemplary implementation of neural network may be executed as follows:
 a. Define Neural Network architecture/model,
 b. Transfer the input data to the exemplary neural network model,
 c. Train the exemplary model incrementally,
 d. determine the accuracy for a specific number of timesteps,
 e. apply the exemplary trained model to process the newly-received input data,
 f. optionally and in parallel, continue to train the exemplary trained model with a predetermined periodicity.

In some embodiments and, optionally, in combination of any embodiment described above or below, the exemplary spam identification module 122 may be in the form of a neural network, having at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous and/or piecewise linear function, sigmoid function, hyperbolic tangent function, and/or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value and/or function that may be used by the aggregation function and/or the activation function to make the node more or less likely to be activated.

In some embodiments, the application(s) and data 108 may include an information classification engine 124 that may be programmed to classify various information transmitted from the dark web analyzing device 150. In some embodiments, the information classification engine 124 may classify such dark web intelligence into an information type category of a plurality of information type categories. In one example, such information type category may describe a content, a context and/or both of information compromised and available at the dark web. Subsequently, the information classification engine 124 may compile, generate, and/or update a data collection recording the compromised information and/or the information type category. In some embodiments, the data collection may be stored in association with the identification information of the respective users (or entities) whom the compromised information belong to at the application(s) and data 108, and/or an external data source. More details of the information classification engine 124 are described with reference to FIG. 4, below.

Still referring to FIG. 1, an illustrative computing device 180 associated with a user may comprise: one or more processors 181 and a non-transient computer memory 182. Memory 182 may store instructions that, when executed by the one or more processors 181, perform various procedures, operations, or processes consistent with disclosed embodiments. In one embodiment, the memory 182 may include an application (APP) 194 that, when executed by the one or more processors 181, may perform operations such as: prompting the user for a permission to detect communications via the computing device 180 (e.g., phone calls, SMS, emails, etc.); detecting communications via the computing device 180 according to the permission obtained from the user; extracting information (e.g., the calling phone number; and texting number; the email sender address, etc.) from the detected communications; monitoring the content of the conversation engaged by the user in the communication; receiving, storing, and/or updating a category list 198 (of the one or more information type categories determined from the user information compromised in the dark web); analyzing the content by, for example, executing at least one machine learning (ML) technique, at least one natural language processing (NLP) technique, and/or both, to obtain context data, content data, and/or both, for the at least one communication; reporting one or more phone numbers determined as suspicious of being spam; training and re-training the at least one ML techniques; and training and re-training the spam identification module 122. In various embodiments, the application 194 may be implemented in any suitable manner such as, without limitation, a standalone application, a browser extension, and the like. Various features and functionality of the application 194 may be implemented as part of other applications, and/or implemented in multiple applications to include more than, less than the features and functionality described above, and/or with combination with any other features and functionality.

In some embodiments, the application 194 may be configured such that the functionality involving phone calls (and communications at various other communication channels) is implemented in a separate application executing on the computing device 180. For instance, such application may be configured to detect a variety of communications of the user at the computing device 180, intercept those communication at the computing device 180, monitor and/or analyzing those communication at the computing device 180, and/or interject one or more suitable controls (e.g., user operable controls) over those communication at the computing device 180. In some embodiments, such application may be configured to obtain information of the communication transmitting party(ies) (e.g., the calling phone number), information of the communication (e.g., the time duration of a phone call), content of the communication (e.g., the identity of an SMS sending entity, the content of the conversation of a phone call). In some embodiments, such application may be configured to obtain permissions from the user in order to execute all or part of the exemplary functionality described above. In some embodiments, the application, 194 may analyze the information type category classified for the at least one item of the comprised information and match the information type category classified for the at least one item of the comprised information to the current information type category based on an analysis of the information type category.

In some embodiments, for the purpose of simplicity, features and functionalities associated with the exemplary ML techniques and the NLP techniques may be provided at the computing device 180 such that the analysis and detection of one or both of the context data and the content data with regard to the communication is performed locally at the computing device 180. In some embodiments, portions or the entirety of the exemplary ML techniques and the NLP techniques may be provided at the server 101, other third-party devices designated for the desired processing of the communication at the computing device 180, and/or some combination thereof.

Various machine learning techniques may be applied to train and re-train the ML techniques with training data and feedback data, respectively. In various implementations, such a machine learning process may be supervised, unsupervised, and/or a combination thereof. In some embodiments, such a machine learning model may comprise a statistical model, a mathematical model, a Bayesian dependency model, a naive Bayesian classifier, a Support Vector Machine (SVMs), a neural network (NN), and/or a Hidden Markov Model. In some embodiments, the ML techniques may be trained and re-trained locally at the computing device 180, the server 101, other third-party devices, and/or some combination thereof.

While only one server 101, dark web analyzing device 150, network 105, and computing device 180 are shown, it will be understood that system 100 may include more than one of any of these components. More generally, the components and arrangement of the components included in system 100 may vary. Thus, system 100 may include other components that perform and/or assist in the performance of one or more processes consistent with the disclosed embodiments. For instance, in some embodiments, the feature and functionality of the server 101 may be partially, or fully implemented at the computing device 180.

Figure 2:
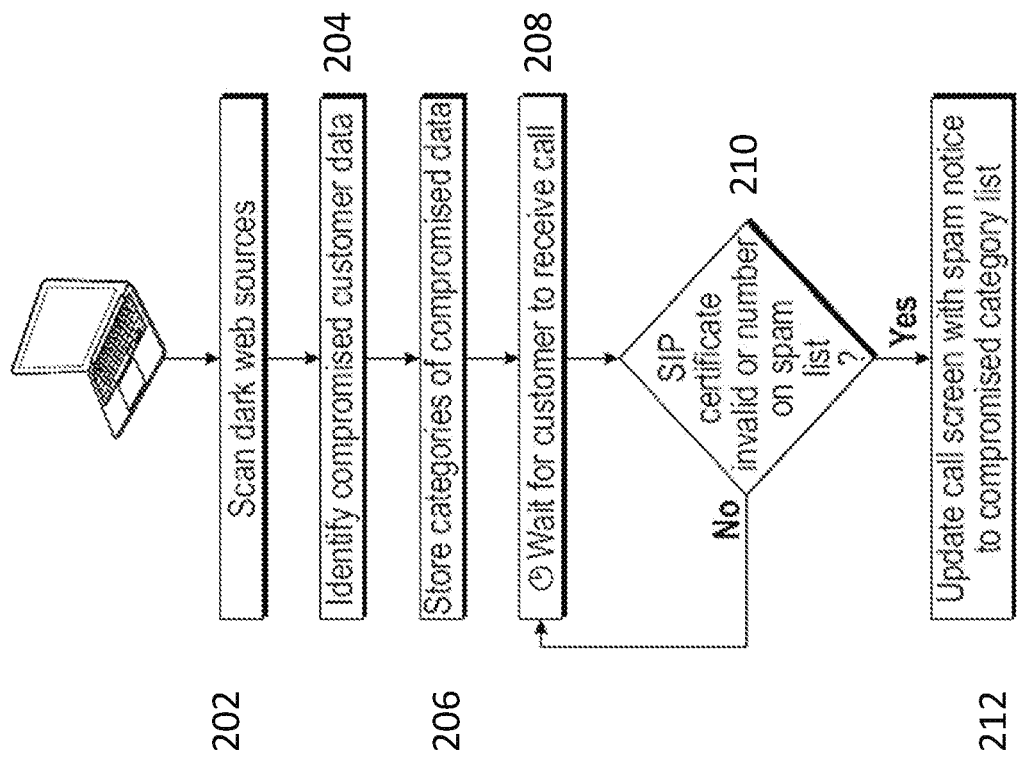
FIG. 2 is a diagram illustrating an exemplary process involving aspects and features associated with contextual notification of compromised information (e.g., anti-vishing notification of information compromised in the dark web), consistent with exemplary aspects of certain embodiments of the present disclosure.

FIG. 2 is a diagram illustrating an exemplary contextual anti-vishing notification of information compromised in the dark web, using one or more machine learning techniques, consistent with exemplary aspects of certain embodiments of the present disclosure. In this illustrated embodiment, the exemplary anti-vishing contextual notification process 200 may provide protection against vishing attacks via calls received at a device of a customer based on the detected customer's information that is compromised and available in the dark web. In this exemplary scenario, the context to present the notification is when the customer receives a call identified as spam at the device. Here, the customer may be the user of FIG. 1, and the device may comprise the computing device 180 as illustrated in FIG. 1.

Here, at the beginning of this exemplary notification flow, the dark web resources are scanned (202) to identify whether and/or what information pertinent to the customer becomes available at the dark web. In some embodiments, the scanning may be performed by the dark web analyzing device 150 using the above described accessing techniques (e.g., a Tor browser, I2P messages) to search for, for example, the customer's name, address, credit card information, and so on. In one example, the scanning may be performed by searching with one or more identifying information of the customer such that to uncover dark web data associated with the customer. Once it is detected that there is customer information compromised in the dark web, the compromised information is identified (204). By way of non-limiting examples, the customer information may include one or more of: a user name, a user account name, a birthday, a birthdate, a home address, a work address, a home phone number, a mobile phone number, a work phone number, a bank account number, authentication credentials, a social security number, a tax payer identification number, and the like.

In some embodiments, the identified compromised customer data may be classified into information type categories such that the categories of the compromised data is stored (206) at, for example, the server 101 and/or the dark web analyzing device 150 of FIG. 1. Here, as the notification is to be provided to the customer who already knows about his/her information that is compromised in the dark web, the abstraction and usage of category information may facilitate the efficient usage of computing resources (e.g., the networking resources to transmit the information to be notified, the computing resources to display the information to be notified), as well as serving the purpose of alarming the customer of not only the particular data that is compromised, but also the possibility that information similar to the compromised data might be breached as well. In some embodiments, the information type category may include one or more of: user name, user address, user phone number, user's high school name, user's college name, spouse information, user birthdate, pet name, parent name, parent address, parent birthdate, parent's pet name, child's name, child's school name, and/or child's teacher's name.

At this stage, instead of transmitting the dark web intelligence on the compromised customer data to the device immediately or proactively, the exemplary anti-vishing contextual notification process 200 may wait, step 208, for the customer to receive a call to determine whether or not it is the right time and/or context to notify the customer of the detected categories of the compromised customer data. Although in this example an incoming call is monitored as a potential context to notify the customer, various other communications may be monitored as well to assess whether the context is right to notify the customer of the compromised data. By way of non-limiting examples, such communication may include one or more of: a phone call, an SMS message, an MMS message, an email, a voice message, a chat message, and/or a social media message.

Next, at step 210, the exemplary anti-vishing contextual notification process 200 determines whether the call received by the customer is a spamming communication that, for example, might pose vishing risk to the customer. Various suitable techniques may be applied to detect whether the call is spam. In one example, the determination may be made based on verifying whether a SIP certificate associated with the call is valid. If such certificate is invalid, the call may be identified as spam. In another example, the phone number from which the call is made can be verified against a list of known spamming phone numbers such that the call may be identified as spam upon a match with an entry in the list. In another example, the spam identification module may be applied to predict whether the call is spam.

In this example, when it is determined that the call is not spam, the exemplary anti-vishing contextual notification process 200 goes back to step 208 to wait for the customer to receive another call. When it is determined that the call is spam at step 210, the exemplary anti-vishing contextual notification process 200 proceeds to notifying the customer of the compromised data. Here, a call screen of the customer may be updated (212) with spam notice including the categories of the compromised customer data. Various suitable techniques may be applied to notify the customer of the compromised data/categories of data, not limited by the examples illustrated herein.

Figure 3:
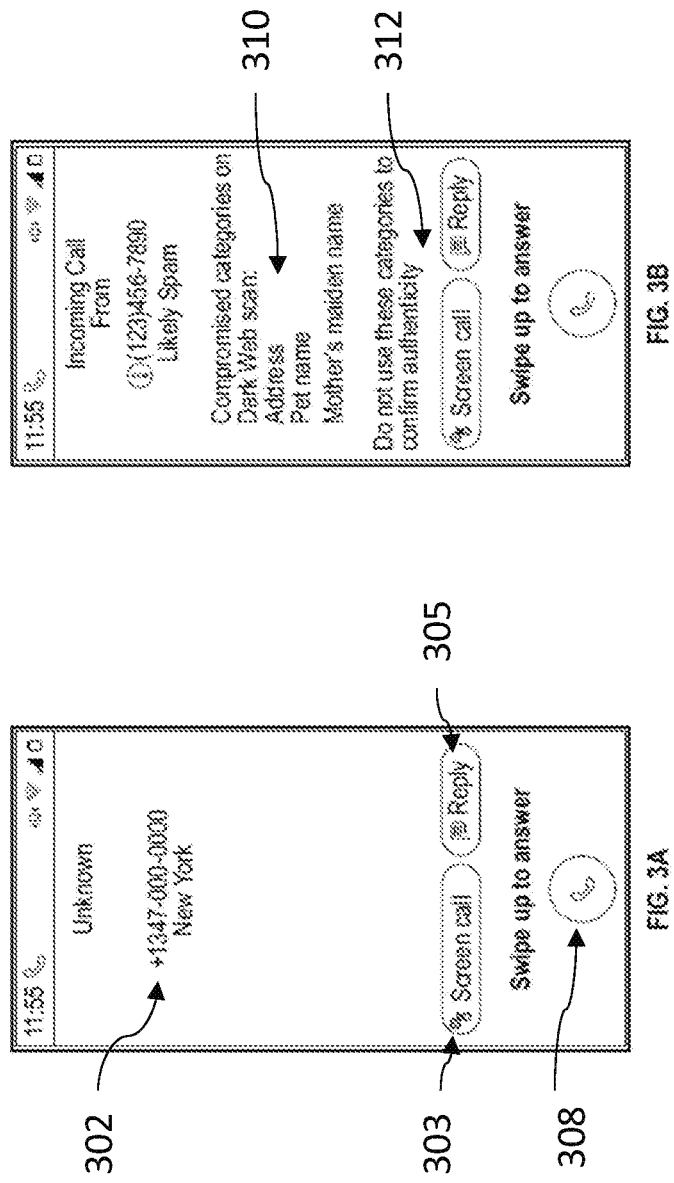
FIGS. 3A-3B are diagrams illustrating exemplary graphical user interfaces (GUIs) involving aspects and features associated with contextual notification of compromised information (e.g., anti-vishing notification of information compromised in the dark web), consistent with exemplary aspects of certain embodiments of the present disclosure.

FIGS. 3A-3B are diagrams illustrating exemplary graphical user interfaces (GUIs) involving aspects associated with an exemplary contextual anti-vishing notification of information compromised in the dark web, consistent with exemplary aspects of certain embodiments of the present disclosure. In some embodiments, the GUIs may be provided by an application (e.g., the illustrative application 194 executing on the computing device 180 of FIG. 1) and shown on a display of a mobile device (e.g., the computing device 180 of FIG. 1). In some embodiments, prior to the GUIs being displayed in response to an incoming call at the mobile device, the incoming call has been determined as spam to activate, for example, the application (194) into notifying the user that the incoming call is suspicious of being associated with a vishing attack, and the like.

FIG. 3A illustrates an exemplary GUI 301 of the application (e.g., the application 194) for notifying the user of an incoming call. The GUI 301 may include an alert 302, and a set of buttons 303, 305, and 308 for the user to select. The alert 302 may notify the user that the incoming call has been identified as unknown. The alert 302 may include the phone number of the calling entity, i.e., "1-347-000-0000," and "New York" as the area associated with the phone number's area code.

At GUI 301, the user can select the button 303 to screen the blocked call, select the button 305 to reply with a message, and/or select the button 308 to swipe up to answer the incoming call. The incoming call can be screened by various techniques to evaluate the characteristics of the calling entity. Exemplary screening techniques may include the user screening a message being recorded on an answering machine and/or voice mail, the user checking a caller ID display to see who and/or where the call is from, and the user checking the time and/or date which a call or message was received. Exemplary screening techniques may also include connecting the calling party to a chatbot service such that the chatbot service may screen the calling party and/or record the conversion. In implementations, screening may be performed by protocols such as Secure Telephony Identity Revisited (STIR), Signature-based Handling of Asserted information using toKENs (SHAKEN) to identify calls associated with spoofing phone numbers, and the like.

Further, the user may perform other actions upon the incoming call in addition to or in place of those illustrated in FIG. 3A. For example, the user can interact with the GUI 301 to decline the incoming call while it is still being blocked, report the phone number included in the alert 302 to a server (e.g., the server 101 of FIG. 1) and/or log locally as associated with a fraudulent entity without screening the call and/or after screening the call, report the phone number and/or log locally as associated with a fraudulent entity after selecting the button 308 to answer the call, report the phone number and/or log locally as not associated with a fraudulent entity after selecting the button 308 to answer the call, and the like.

FIG. 3B illustrates the exemplary GUI 301 of the application (e.g., the application 194) for notifying the user of the incoming call when the application detects web data, and the incoming call may be a spam call. In some embodiments and in response to detecting dark web data (shown in FIG. 4) associated with the incoming call, the application (e.g., the application 194) utilizes the machine learning technique and the natural language processing technique to monitor context data and content data associated with the incoming call and instructing the exemplary GUI 301 to display comprised context data as at least one comprised category 310. In some embodiments, the application (e.g., the application 194) may generate a notice 312 that instruct the exemplary GUI 301 to display a message stating that the at least one category has been comprised so the user can utilize other methods of confirming authenticity during the incoming call.

Figure 4:
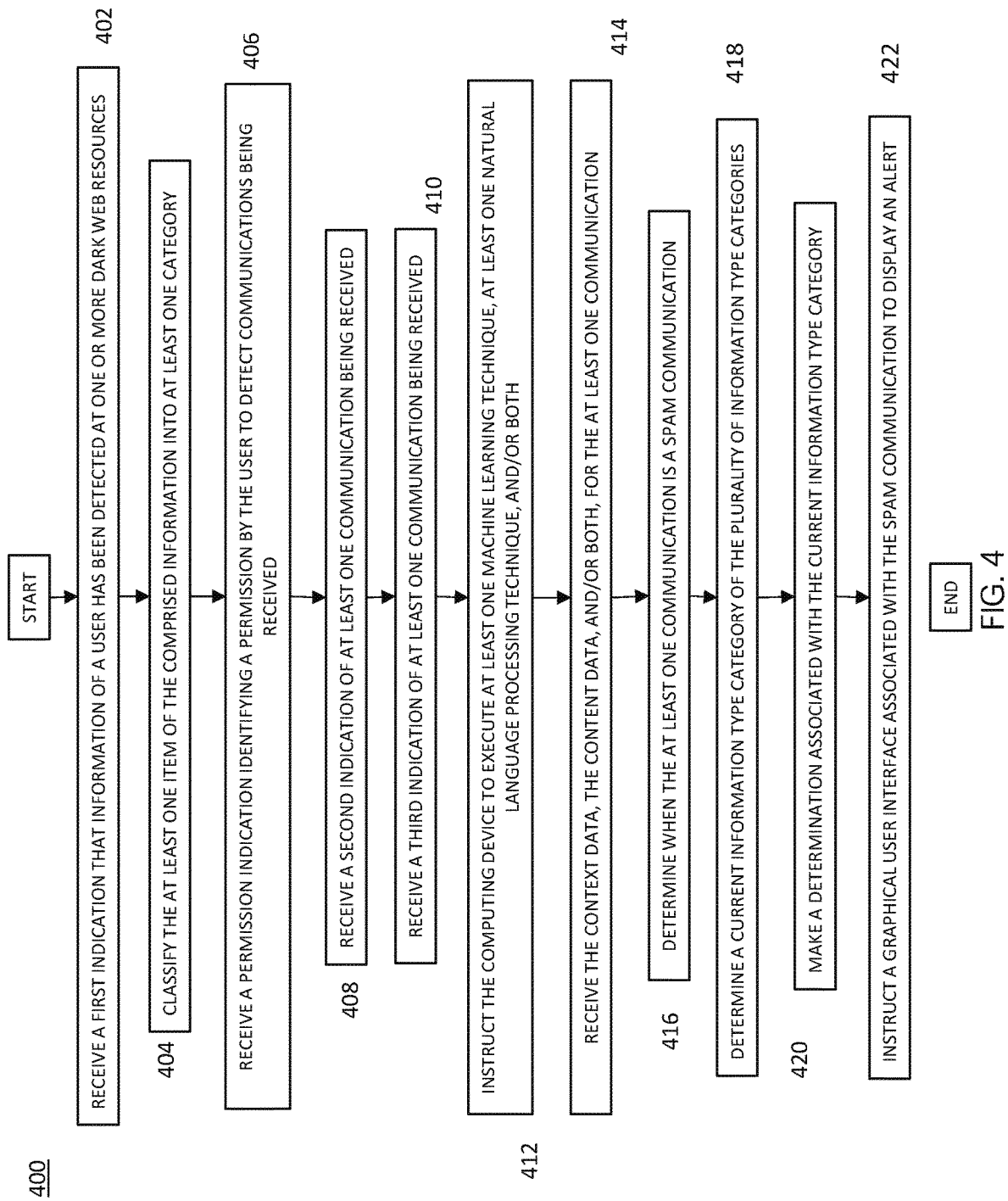
FIG. 4 is a flowchart illustrating an exemplary process related to contextual notification of compromised information (e.g., anti-vishing notification of information compromised in the dark web), consistent with exemplary aspects of certain embodiments of the present disclosure.

FIG. 4 is a flow diagram illustrating an exemplary process 400 related to anti-vishing contextual notification of information compromised in the dark web, via machine learning techniques, consistent with exemplary aspects of at least some embodiments of the present disclosure.

In step 402, the spam identification modulespam identification module 122 may receive a first indication that information of a user has been detected at one or more dark web resources. In some embodiments, the spam identification modulespam identification module 122 may receive the first indication that information of the user has been detected as one or more dark web resources including at least one item of compromised information. In some instances, the compromised information may include address of user, pet name associated with the user, and a maiden name associated with a mother associated with the user.

In step 404, the spam identification modulespam identification module 122 may classify the at least one item of the comprised information into at least one category of a plurality of information type categories. In some embodiments, the spam identification modulespam identification module 122 may classify the at least one item of the comprised information into at least one information type category. In some instances, the at least one information type category may include but is not limited to a content, a context, and/or both, which may include the provide additional information to the compromised information.

In step 406, the spam identification modulespam identification module 122 may receive a permission indicator identifying a permission by a user to detect communications being received by a computing device of the user. In some embodiments, the permission indicator may be received from an application such as the application 194 executing on a computing device of the user. The details are similar to those described with reference to FIG. 1, and not repeated herein. In some embodiments, the permission indicator may be received from an application such as a web page allowing the user to configure his or her settings at a web browser. In some embodiments, the user may configure the settings related to calls, and/or other communication detection capabilities for various computing devices thereof. That is, the permission indicator may be received from an application and/or a computing device other than the application for detecting the calls (and other communications), or the computing on which the call detecting/protection application is executing.

In step 408, the spam identification module 122 may receive a second indication of at least one communication being received. In some embodiments, the spam identification module 122 may receive the second indication of the at least one communication being received. In some instances, the second indication of the at least one communication may refer to a second phone call, a second text message, a second email transmission, and/or a second alternative transmission from the computing device. In some embodiments, the application 194 may utilize at least one machine learning technique and at least one natural language processing technique to obtain context data and content data for the at least one communication.

In step 410, the spam identification module 122 may receive a third indication of at least one communication being received. In some embodiments, the spam identification module 122 may receive the third indication of at least one communication being received that the user engages an interaction with the at least one communication. In some embodiments, the user may engage the interaction with the at least one communication by answering and/or responding to the at least one communication.

In step 412, the spam identification module 122 may instruct the computing device to execute at least one machine learning technique, at least one natural language processing techniques, and/or both. In some embodiments, the spam identification module 122 may instruct the computing device to execute at least one machine learning technique, at least one natural language processing techniques, and/or both, to obtain context data, content data, and/or both, for the at least one communication.

In step 414, the spam identification module 122 may receive the context data, the content data, and/or both, for the at least one communication. In some embodiments, the spam identification module 122 may receive the context data, the content data, and/or both, for the at least one communication associated with an analysis and utilization of the at least one machine learning technique, the at least one natural language processing algorithm technique, and/or both.

In step 416, the spam identification module 122 may determine when the at least one communication is a spam communication. In some embodiments, the spam identification module 122 may determine when the at least one communication is the spam communication based on the context data, the content data, and/or both, for the at least one communication. In some embodiments, the spam identification module 122 may determine when the at least one communication is the spam communication based on the analysis and utilization of the at least one machine learning technique, the at least one natural language processing algorithm technique, and/or both, to obtain the context data, the content data, and/or both, for the at least one communication.

In step 418, the spam identification module 122 may determine a current information type category of the plurality of information type categories. In some embodiments, the spam identification module 122 may determine the current information type category of the plurality of information type categories in real time. In some embodiments, the spam identification module 122 may determine the current information type category of the plurality of information type categories based on the context data, the content data, and/or both, that is being discussed during the spam communication. In some embodiments, the spam identification module 122 may determine the current information type category of the plurality of information type categories during the spam communication. In some embodiments, the application, 194 may analyze the information type category classified for the at least one item of the comprised information and match the information type category classified for the at least one item of the comprised information to the current information type category based on an analysis of the information type category.

In step 420, the spam identification module 122 may make a determination associated with the current information type category. In some embodiments, the spam identification module 122 may make a determination that the current information type category corresponds to the information type category classified for the at least one item of the compromised information.

In step 422, the spam identification module 122 may instruct a graphical user interface (GUI) associated with the spam communication to display an alert. In some embodiments, the spam identification module 122 may instruct the GUI associated with the spam communication to display the alert indicating to the user at least one of: the current information type category has been compromised, the at least one item of the compromised information, and/or both.

Figure 5:
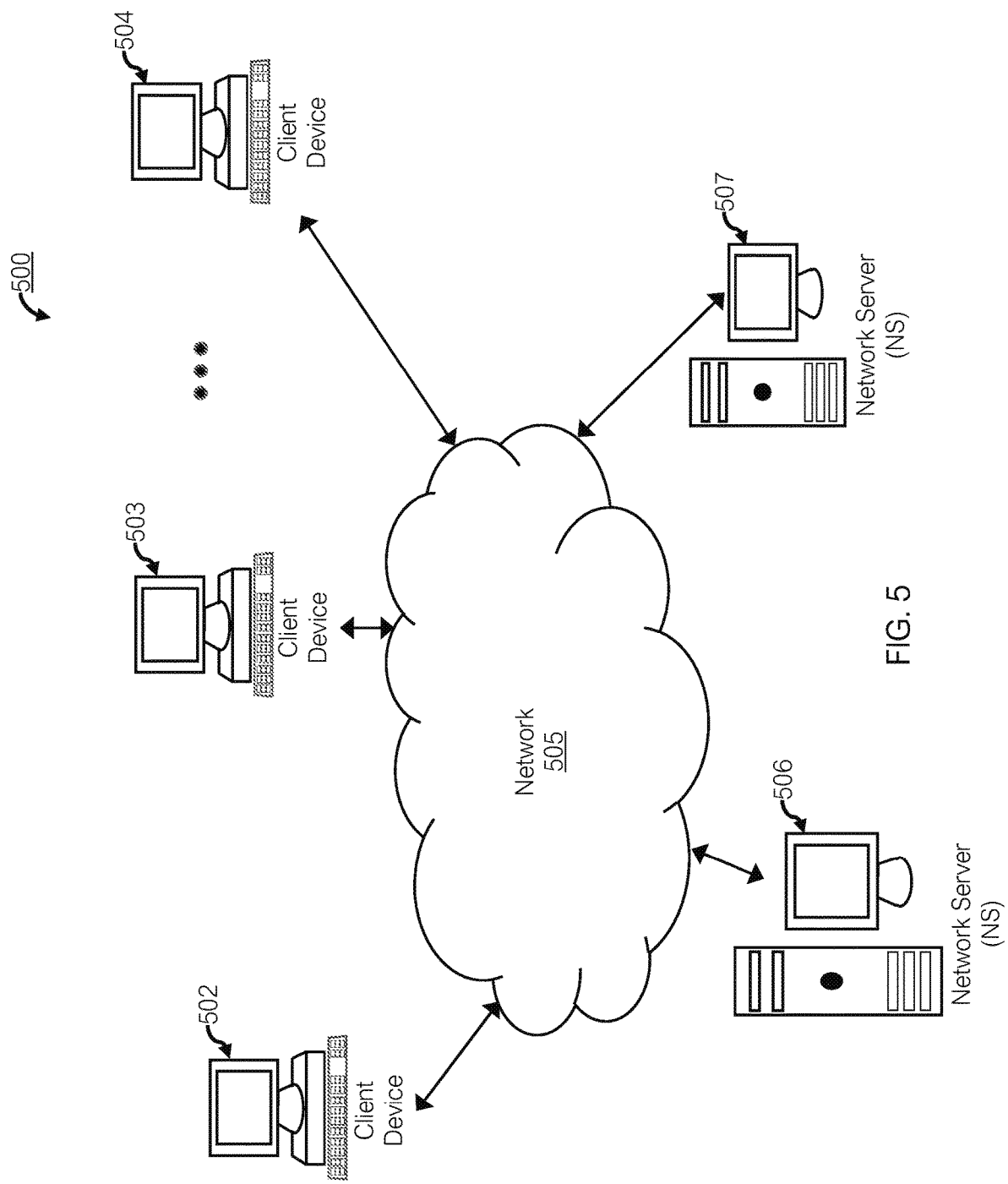
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 502-504 (e.g., clients) of the exemplary computer-based system/platform may include virtually any computing device capable of receiving and sending a message over a network (e.g., cloud network), such as network 505, to and from another computing device, such as servers 506 and 507, each other, and the like. In some embodiments, the member devices 502-504 may be configured to implement part of the entirety of the features and functionalities above-described for the computing device 180 of FIG. 1. In some embodiments, the servers 506 and 507 may be configured to implement part of the entirety of the features and functionalities above-described for the server 101 of FIG. 1. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer- or machine-readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content sources, etc. Any of the features of the exemplary server 506 may also be implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
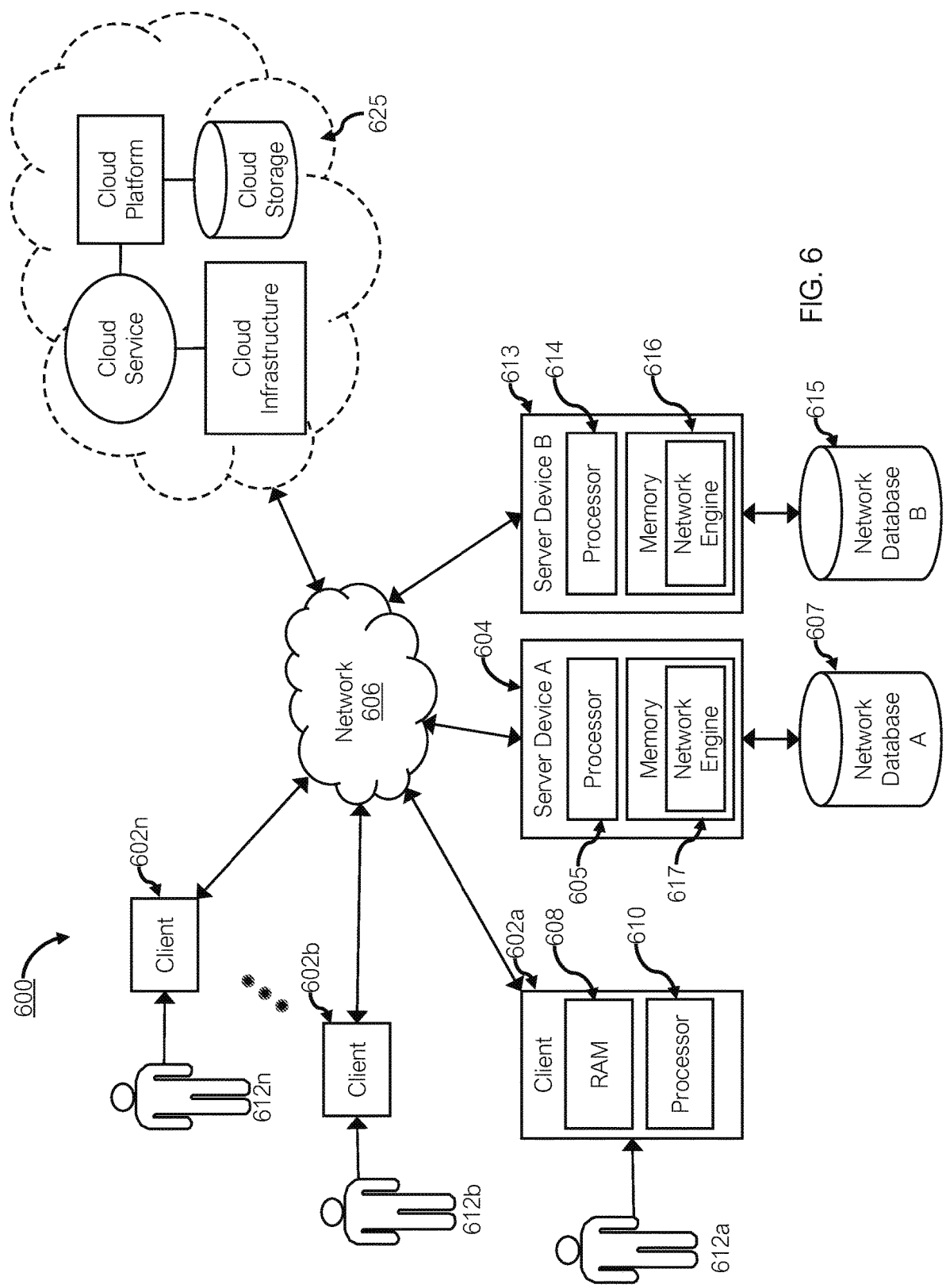
FIG. 6 is a block diagram depicting another exemplary computer-based system, in accordance with certain embodiments of the present disclosure.

FIG. 6 depicts a block diagram of another exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 602a, 602b through 602n shown each at least includes non-transitory computer-readable media, such as a random-access memory (RAM) 608 coupled to a processor 610 and/or memory 608. In some embodiments, the member computing devices 602a, 602b through 602n may be configured to implement part of the entirety of the features and functionalities above-described for the computing device 180 of FIG. 1. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, a speaker, or other input or output devices. In some embodiments, examples of member computing devices 602a through 602n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 612n, may communicate over the exemplary network 606 with each other and/or with other systems and/or devices coupled to the network 606.

As shown in FIG. 6, exemplary server devices 604 and 613 may be also coupled to the network 606. In some embodiments, one or more member computing devices 602a through 602n may be mobile clients. In some embodiments, the server devices 604 and 613 may be configured to implement part of the entirety of the features and functionalities above-described for the server 101 of FIG. 1. In some embodiments, server devices 604 and 613 shown each at least includes respective computer-readable media, such as a random-access memory (RAM) coupled to a respective processor 605, 614 and/or respective memory 617, 616. In some embodiments, the processor 605, 614 may execute computer-executable program instructions stored in memory 617, 616, respectively. In some embodiments, the processor 605, 614 may include a microprocessor, an ASIC, and/or a state machine. In some embodiments, the processor 605, 614 may include, or may be in communication with, media, for example computer-readable media, which stores instructions that, when executed by the processor 605, 614, may cause the processor 605, 614 to perform one or more steps described herein. In some embodiments, examples of computer-readable media may include, but are not limited to, an electronic, optical, magnetic, or other storage or transmission device capable of providing a processor, such as the respective processor 605, 614 of server devices 604 and 613, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
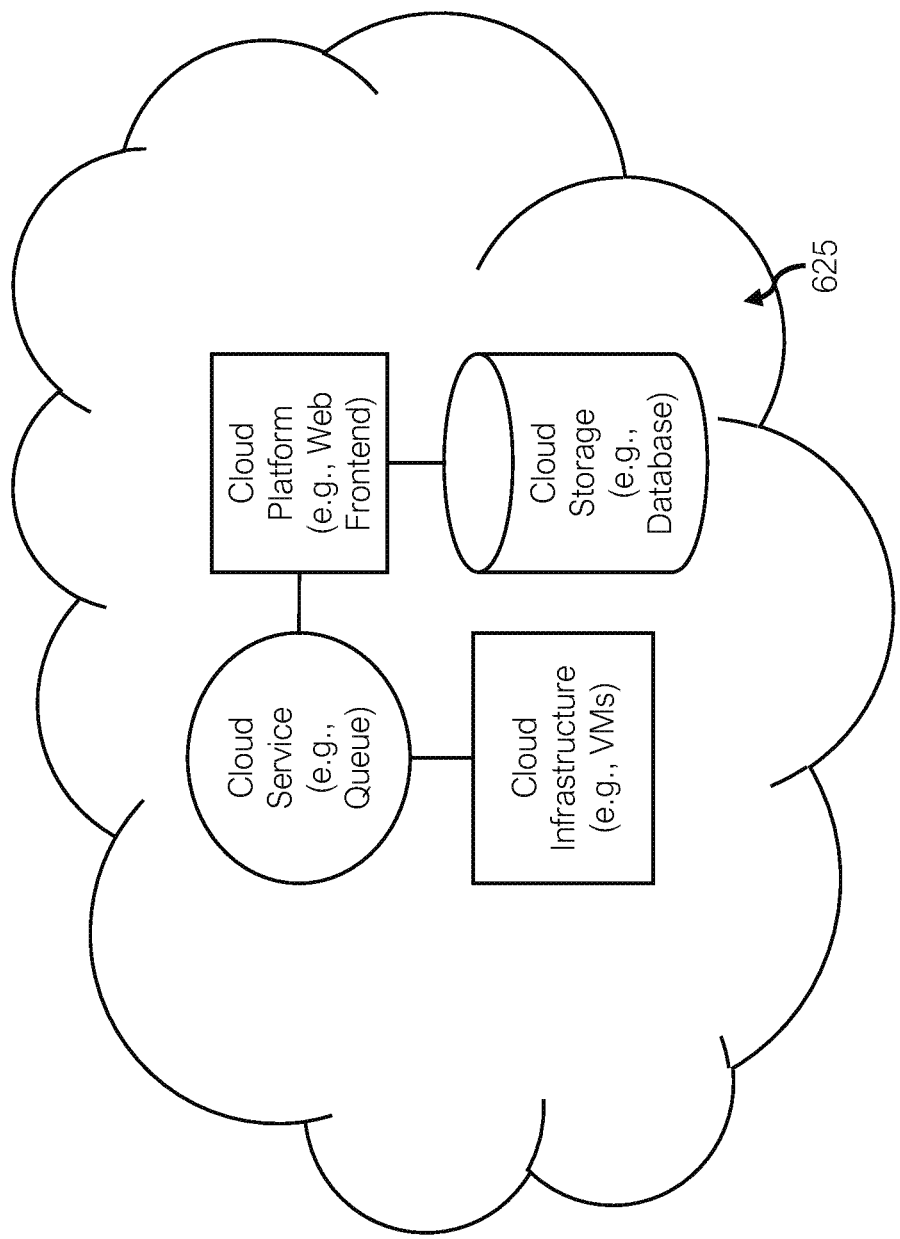
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
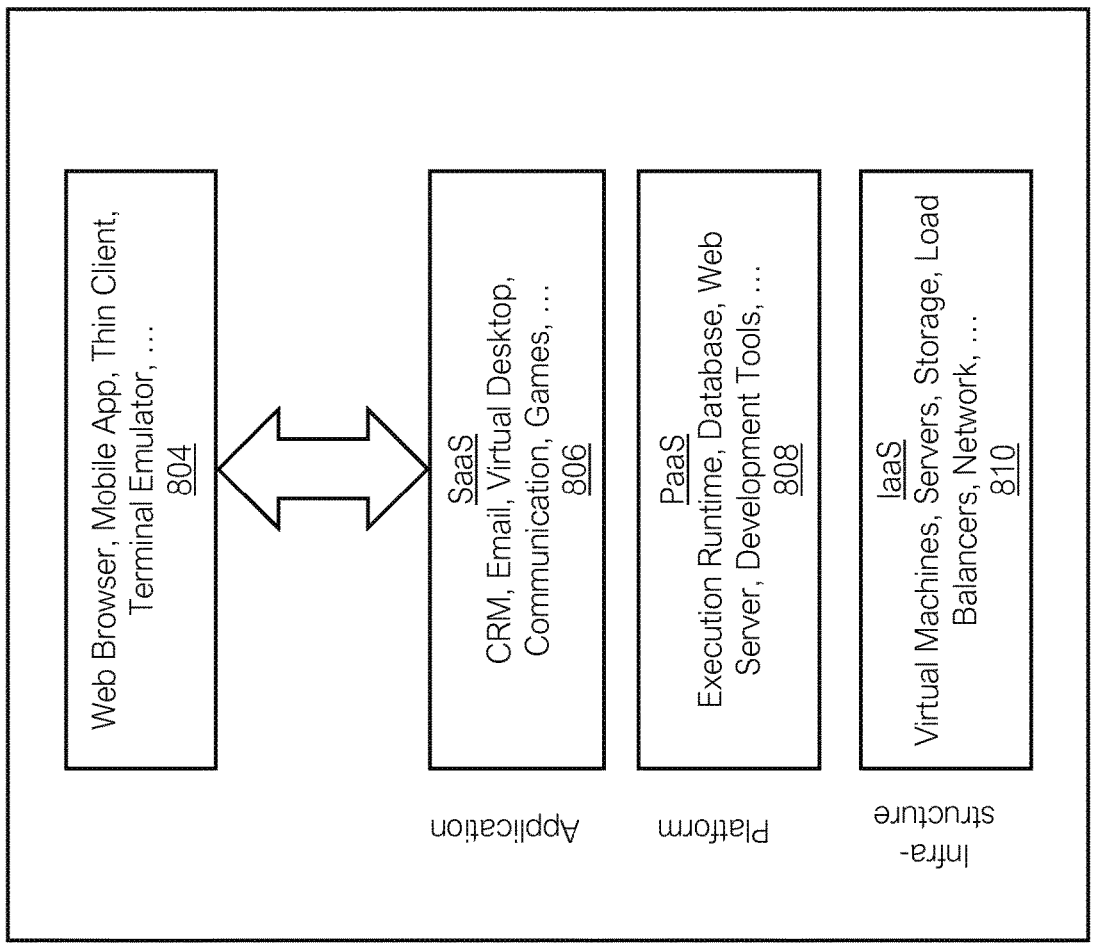

As also shown in FIGS. 7 and 8, some embodiments of the disclosed technology may also include and/or involve one or more cloud components 625, which are shown grouped together in the drawing for sake of illustration, though may be distributed in various ways as known in the art. Cloud components 625 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 710, platform as a service (PaaS) 708, and/or software as a service (SaaS) 706. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 706, 708, 710 may be utilized in connection with the Web browser and browser extension aspects, shown at 704, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 101, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method may include: receiving, by one or more processors, a first indication that information of a user has been detected at one or more dark web resources, the first indication including at least one item of compromised information; classifying, by the one or more processors, the at least one item of the compromised information into an information type category of a plurality of information type categories, the information type category describing a content, a context, or both, of the at least one item of the compromised information; receiving, by the one or more processors, from a computing device of the user, a permission indicator identifying a permission by the user to detect communications being received by the computing device; receiving, by the one or more processors, from the computing device, a second indication of at least one communication being received; receiving, by the one or more processors, a third indication that the user engages an interaction with the at least one communication; instructing, by the one or more processors, after receiving the third indication, the computing device to execute at least one machine learning (ML) technique, at least one natural language processing (NLP) technique, or both, to obtain context data, content data, or both, for the at least one communication; receiving, by the one or more processors, from the computing device, the context data, the content data, or both, for the at least one communication; determining, by the one or more processors, when the at least one communication is a spam communication based on the context data, the content data, or both, for the at least one communication; determining, by the one or more processors, in real-time, during the spam communication, based on the context data, the content data, or both, a current information type category of the plurality of information type categories that is being discussed during the spam communication; making, by the one or more processors, in real-time, during the spam communication, a determination that the current information type category corresponds to the information type category classified for the at least one item of the compromised information; and instructing, by the one or more processors, and in response to the received third indication and the determination, the computing device to present, to the user, a graphical user interface (GUI) associated with the spam communication, where the GUI comprises at least one GUI element, displaying an alert indicating to the user at least one of: the current information type category has been compromised, the at least one item of the compromised information, or both.

Clause 2. The method according to clause 1, where the first indication is generated by scanning the one or more dark web resources.

Clause 3. The method according to clause 1 or 2, where the at least one communication comprises one or more of: a phone call, an SMS message, an MMS message, an email, a voice message, a chat message, or a social media message.

Clause 4. The method according to clause 1, 2 or 3, where the at least one communication is determined as spam based on a SIP certificate of the at least one communication.

Clause 5. The method according to clause 1, 2, 3 or 4, where the at least one communication is determined as spam based on a trained spam detection machine learning model.

Clause 6. The method according to clause 1, 2, 3, 4 or 5, where the at least one communication is an incoming phone call, and where the GUI element is displayed prior to the user answers the phone call.

Clause 7. The method according to clause 1, 2, 3, 4, 5 or 6, where the at least one communication is an incoming phone call, and where the GUI element is displayed prior to the user answers the phone call.

Clause 8. The method according to clause 1, 2, 3, 4, 5, 6 or 7, where the at least one communication is an SMS message, and where the GUI element is displayed prior to the user opens the SMS message.

Clause 9. The method according to clause 1, 2, 3, 4, 5, 6, 7 or 8, where the at least one communication is an email, and where the GUI element is displayed prior to the user opens the email.

Clause 10. The method according to clause 1, 2, 3, 4, 5, 6, 7, 8 or 9, where making the determination that the current information type category corresponds to the information type category classified for the at least one item of the compromised information includes: analyzing the information type category classified for the at least one item of the comprised information and matching the information type category classified for the at least one item of the comprised information to the current information type category based on an analysis of the information type category.

Clause 11. The method according to clause 1, 2, 3, 4, 5, 6, 7, 8, 9 or 10, where the compromised information includes at least one of: a user name, a user account name, a birthday, a birthdate, a home address, a work address, a home phone number, a mobile phone number, a work phone number, a bank account number, authentication credentials, a social security number, and a tax payer identification number.

Clause 12. A system may include: a non-transient computer memory, storing software instructions; and at least one processor of a computing device; where, when the at least one processor executes the software instructions, the computing device is programmed to: receive a first indication that information of a user has been detected at one or more dark web resources, the first indication including at least one item of compromised information; classify the at least one item of the compromised information into an information type category of a plurality of information type categories, the information type category describing a content, a context, or both, of the at least one item of the compromised information; receive, from a computing device of the user, a permission indicator identifying a permission by the user to detect communications being received by the computing device; receive, from the computing device, a second indication of at least one communication being received; receive, a third indication that the user engages an interaction with the at least one communication; instruct, after receiving the third indication, the computing device to execute at least one machine learning (ML) technique, at least one natural language processing (NLP) technique, or both, to obtain context data, content data, or both, for the at least one communication; receive, from the computing device, the context data, the content data, or both, for the at least one communication; determine, when the at least one communication is a spam communication based on the context data, the content data, or both, for the at least one communication; determine, in real-time, during the spam communication, based on the context data, the content data, or both, a current information type category of the plurality of information type categories that is being discussed during the spam communication; make, in real-time, during the spam communication, a determination that the current information type category corresponds to the information type category classified for at least one item of the compromised information; and instruct, and in response to the received third indication and the determination, the computing device to present, to the user, a graphical user interface (GUI) associated with the spam communication, where the GUI includes at least one GUI element, displaying an alert indicating to the user at least one of: the current information type category has been compromised, the at least one item of the compromised information, or both.

Clause 13. The system according to clause 12, where the first indication is generated by scanning the one or more dark web resources.

Clause 14. The system according to clause 12 or 13, where the at least one communication comprises one or more of: a phone call, an SMS message, an MMS message, an email, a voice message, a chat message, or a social media message.

Clause 15. The system according to clause 12, 13, or 14, where the at least one communication is determined as spam based on a SIP certificate of the at least one communication.

Clause 16. The system according to clause 12, 13, 14, or 15, where the at least one communication is determined as spam based on a trained spam detection machine learning model.

Clause 17. The system according to clause 12, 13, 14, 15, or 16, where the at least one communication is an incoming phone call, and where the GUI element is displayed prior to the user answers the phone call.

Clause 18. The system according to clause 12, 13, 14, 15, 16, or 17, where the at least one communication is an incoming phone call, and where the GUI element is displayed after the user answers the phone call.

Clause 19. The system according to clause 12, 13, 14, 15, 16, 17, or 18, where the at least one communication is an SMS message, and where the GUI element is displayed prior to the user opens the SMS message.

Clause 20. A computing device including: a non-transient computer memory, storing software instructions; and at least one processor; where, when the at least one processor executes the software instructions, the computing device is programmed to: receive a first indication that information of a user has been detected at one or more dark web resources, the first indication including at least one item of compromised information; classify the at least one item of the compromised information into an information type category of a plurality of information type categories, the information type category describing a content, a context, or both, of the at least one item of the compromised information; receive, from a computing device of the user, a permission indicator identifying a permission by the user to detect communications being received by the computing device; receive, from the computing device, a second indication of at least one communication being received; receive, a third indication that the user engages an interaction with the at least one communication; instruct, after receiving the third indication, the computing device to execute at least one machine learning (ML) technique, at least one natural language processing (NLP) technique, or both, to obtain context data, content data, or both, for the at least one communication; receive, from the computing device, the context data, the content data, or both, for the at least one communication; determine, when the at least one communication is a spam communication based on the context data, the content data, or both, for the at least one communication; determine, in real-time, during the spam communication, based on the context data, the content data, or both, a current information type category of the plurality of information type categories that is being discussed during the spam communication; make, in real-time, during the spam communication, a determination that the current information type category corresponds to the information type category classified for at least one item of the compromised information; and instruct, and in response to the received third indication and the determination, the computing device to present, to the user, a graphical user interface (GUI) associated with the spam communication, where the GUI includes at least one GUI element, displaying an alert indicating to the user at least one of: the current information type category has been compromised, the at least one item of the compromised information, or both.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
    receiving, by one or more processors, a first indication that information of a user has been detected at one or more dark web resources, the first indication including at least one item of compromised information;
    classifying, by the one or more processors, the at least one item of the compromised information into an information type category of a plurality of information type categories, the information type category describing a content, a context, or both, of the at least one item of the compromised information;
    receiving, by the one or more processors, from a computing device of the user, a permission indicator identifying a permission by the user to detect communications being received by the computing device;
    receiving, by the one or more processors, from the computing device, a second indication of at least one communication being received;
    receiving, by the one or more processors, a third indication that the user engages an interaction with the at least one communication;
    instructing, by the one or more processors, after receiving the third indication, the computing device to execute at least one machine learning (ML) technique, at least one natural language processing (NLP) technique, or both, to obtain context data, content data, or both, for the at least one communication;
    receiving, by the one or more processors, from the computing device, the context data, the content data, or both, for the at least one communication;
    determining, by the one or more processors, when the at least one communication is a spam communication based on the context data, the content data, or both, for the at least one communication;
    determining, by the one or more processors, in real-time, during the spam communication, based on the context data, the content data, or both, a current information type category of the plurality of information type categories that is being discussed during the spam communication;
    making, by the one or more processors, in real-time, during the spam communication, a determination that the current information type category corresponds to the information type category classified for the at least one item of the compromised information; and
    instructing, by the one or more processors, and in response to the received third indication and the determination, the computing device to present, to the user, a graphical user interface (GUI) associated with the spam communication, wherein the GUI comprises at least one GUI element, to display an alert indicating to the user at least one of: the current information type category has been compromised, the at least one item of the compromised information, or both.

2. The method of claim 1, wherein the first indication is generated by scanning the one or more dark web resources.

3. The method of claim 1, wherein the at least one communication comprises one or more of: a phone call, an SMS message, an MMS message, an email, a voice message, a chat message, or a social media message.

4. The method of claim 1, wherein the at least one communication is determined as spam based on a SIP certificate of the at least one communication.

5. The method of claim 1, wherein the at least one communication is determined as spam based on a trained spam detection machine learning model.

6. The method of claim 1, wherein the at least one communication is an incoming phone call, and wherein the GUI element is displayed prior to the user answers the phone call.

7. The method of claim 1, wherein the at least one communication is an incoming phone call, and wherein the GUI element is displayed after the user answers the phone call.

8. The method of claim 1, wherein the at least one communication is an SMS message, and wherein the GUI element is displayed prior to the user opening the SMS message.

9. The method of claim 1, wherein the at least one communication is an email, and wherein the GUI element is displayed prior to the user opening the email.

10. The method of claim 1, wherein making the determination that the current information type category corresponds to the information type category classified for the at least one item of the compromised information comprises:
    analyzing the information type category classified for the at least one item of the comprised information; and
    matching the information type category classified for the at least one item of the comprised information to the current information type category based on an analysis of the information type category.

11. The method of claim 1, wherein the compromised information comprises at least one of: a user name, a user account name, a birthday, a birthdate, a home address, a work address, a home phone number, a mobile phone number, a work phone number, a bank account number, authentication credentials, a social security number, a tax payer identification number, a pet name, a parent name, a child name, a former name, the name of a favorite interest, the name of a school, and the name of a mascot.

12. A system comprising:
    a non-transient computer memory, storing software instructions; and
    at least one processor of a computing device;
    wherein, when the at least one processor executes the software instructions, the computing device is programmed to:
        receive a first indication that information of a user has been detected at one or more dark web resources, the first indication including at least one item of compromised information;
        classify the at least one item of the compromised information into an information type category of a plurality of information type categories, the information type category describing a content, a context, or both, of the at least one item of the compromised information;

receive, from a computing device of the user, a permission indicator identifying a permission by the user to detect communications being received by the computing device;

receive, from the computing device, a second indication of at least one communication being received;

receive, a third indication that the user engages an interaction with the at least one communication;

instruct, after receiving the third indication, the computing device to execute at least one machine learning (ML) technique, at least one natural language processing (NLP) technique, or both, to obtain context data, content data, or both, for the at least one communication;

receive, from the computing device, the context data, the content data, or both, for the at least one communication;

determine, when the at least one communication is a spam communication based on the context data, the content data, or both, for the at least one communication;

determine, in real-time, during the spam communication, based on the context data, the content data, or both, a current information type category of the plurality of information type categories that is being discussed during the spam communication;

make, in real-time, during the spam communication, a determination that the current information type category corresponds to the information type category classified for at least one item of the compromised information; and instruct, and in response to the received third indication and the determination, the computing device to present, to the user, a graphical user interface (GUI) associated with the spam communication, wherein the GUI comprises at least one GUI element, to display an alert indicating to the user at least one of: the current information type category has been compromised, the at least one item of the compromised information, or both.

13. The system of claim 12, wherein the first indication is generated by scanning the one or more dark web resources.

14. The system of claim 12, wherein the at least one communication comprises one or more of: a phone call, an SMS message, an MMS message, an email, a voice message, a chat message, or a social media message.

15. The system of claim 12, wherein the at least one communication is determined as spam based on a SIP certificate of the at least one communication.

16. The system of claim 12, wherein the at least one communication is determined as spam based on a trained spam detection machine learning model.

17. The system of claim 12, wherein the at least one communication is an incoming phone call, and wherein the GUI element is displayed prior to the user answering the phone call.

18. The system of claim 12, wherein the at least one communication is an incoming phone call, and wherein the GUI element is displayed after the user answers the phone call.

19. The system of claim 12, wherein the at least one communication is an SMS message, and wherein the GUI element is displayed prior to the user opens the SMS message.

20. A computing device comprising:
a non-transient computer memory, storing software instructions; and
at least one processor;
wherein, when the at least one processor executes the software instructions, the computing device is programmed to:
receive a first indication that information of a user has been detected at one or more dark web resources, the first indication including at least one item of compromised information;

classify the at least one item of the compromised information into an information type category of a plurality of information type categories, the information type category describing a content, a context, or both, of the at least one item of the compromised information;

receive, from a computing device of the user, a permission indicator identifying a permission by the user to detect communications being received by the computing device;

receive, from the computing device, a second indication of at least one communication being received;

receive, a third indication that the user engages an interaction with the at least one communication;

instruct, after receiving the third indication, the computing device to execute at least one machine learning (ML) technique, at least one natural language processing (NLP) technique, or both, to obtain context data, content data, or both, for the at least one communication;

receive, from the computing device, the context data, the content data, or both, for the at least one communication;

determine, when the at least one communication is a spam communication based on the context data, the content data, or both, for the at least one communication;

determine, in real-time, during the spam communication, based on the context data, the content data, or both, a current information type category of the plurality of information type categories that is being discussed during the spam communication;

make, in real-time, during the spam communication, a determination that the current information type category corresponds to the information type category classified for at least one item of the compromised information; and instruct, and in response to the received third indication and the determination, the computing device to present, to the user, a graphical user interface (GUI) associated with the spam communication, wherein the GUI comprises at least one GUI element, to display an alert indicating to the user at least one of: the current information type category has been compromised, the at least one item of the compromised information, or both.

* * * * *